Nov. 30, 1926.
E. G. HERBERT
1,608,655
METHOD OF AND MEANS FOR TESTING THE HARDNESS OF METALS AND OTHER MATERIALS
Filed Feb. 15, 1923 2 Sheets-Sheet 1

Inventor:
Edward Geisler Herbert.

By his Attorney: Walter Sunn

Nov. 30, 1926.  1,608,655
E. G. HERBERT
METHOD OF AND MEANS FOR TESTING THE HARDNESS OF METALS AND OTHER MATERIALS
Filed Feb. 15, 1923   2 Sheets-Sheet 2
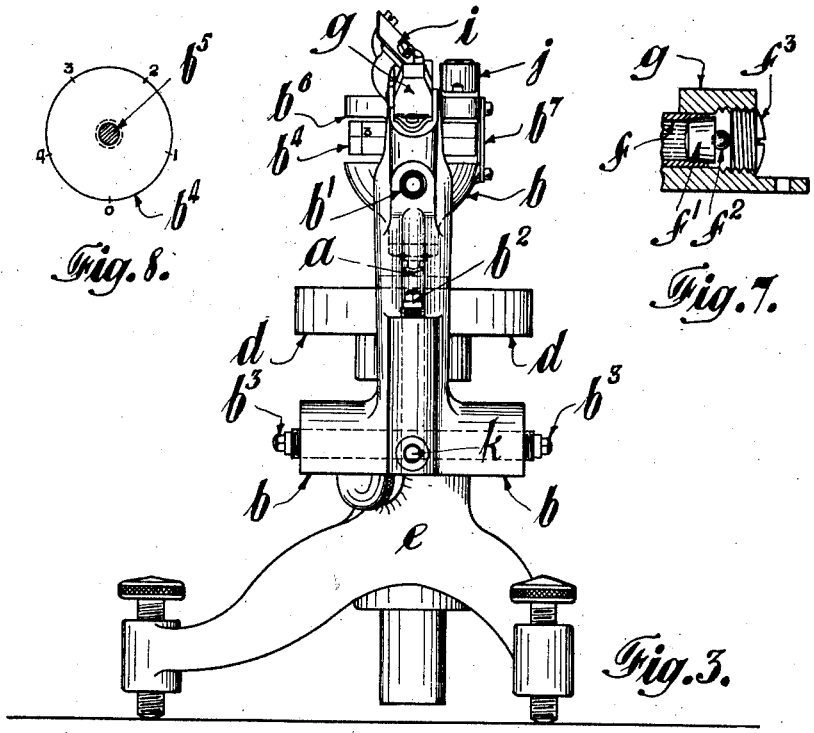
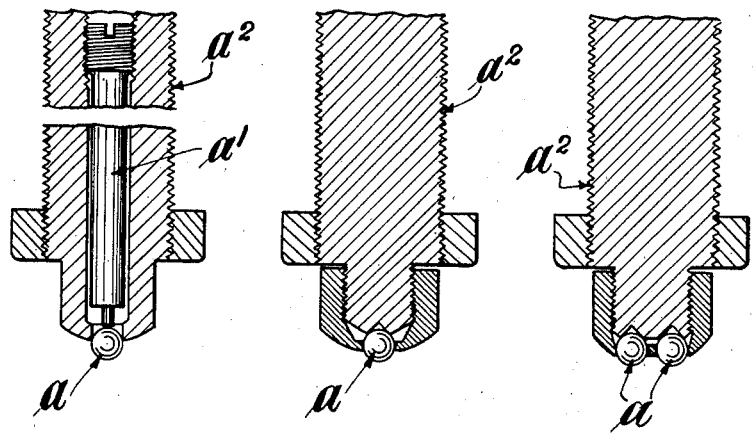
Inventor:
Edward Geisler Herbert.
By his Attorney: Walter Gunn Patented Nov. 30, 1926.

1,608,655

UNITED STATES PATENT OFFICE.

EDWARD GEISLER HERBERT, OF LEVENSHULME, ENGLAND.

METHOD OF AND MEANS FOR TESTING THE HARDNESS OF METALS AND OTHER MATERIALS.

Application filed February 15, 1923, Serial No. 619,265, and in Great Britain September 7, 1922.

This invention refers to a new or improved method of and means for testing metals and other materials for hardness. The object of the invention is to provide a method of testing the relative hardness of materials, and particularly of very hard materials such as hardened steel, which can be quickly, reliably, and easily carried out, and which shall be free of the principal objections to the known methods of hardness measurement by indenting the material, namely, the extreme difficulty of directly measuring the depth or diameter of the indentation by microscopic or other means of measurement, especially in very hard materials, and the unreliability of all forms of hardness measurement depending on impact or rebound, which arises from the fact that the effectiveness of a blow is dependent on the mass and on the rigidity of the article struck and of its support.

According to this invention, the relative hardness of a material is tested or measured by rolling a very hard test member upon the surface of the material, and effecting such rolling action by means of a swinging gravitational weight member or compound pendulum, the result of the test being indicated either:

(1) by a comparison of the time taken for a given number of oscillations of the pendulum (or by a comparison of the number of oscillations in a given time) with different materials hereinafter called the "time" test, or;

(2) by the difference in amplitude of oscillation of the pendulum with different degrees of hardness, hereinafter called the "scale" test.

It has been found by experiment that there is a definite relationship between the time period of oscillation of the pendulum when resting on a given material and the hardness of that material, and therefore by a comparison of the different times taken for a given number of oscillations with various materials (or the number of oscillations in a given time) a very simple and reliable test of hardness is afforded. It has also been found that the variations in amplitude of oscillation of the pendulum also have a definite relationship to the degrees of hardness, and thus furnish an additional or alternative means of testing for hardness.

In a machine or instrument suitable for carrying out the said methods of hardness testing, the test member is composed of some very hard material, such as sapphire or hardened steel, and is made to a form capable of rolling upon the surface of the material to be tested. Combined with such test member is a weight member which when the test member is resting upon a horizontal surface, presses the test member against the said surface. Means are provided in or on said weight member whereby the centre of gravity can be accurately adjusted to coincide with the centre of curvature of the test member so that when the latter is placed upon a smooth hard horizontal surface, the test member will be in neutral equilibrium, i. e., without any tendency to roll, and will support and maintain the weight member with its axes in any position in which they may be placed. Means are also provided for lowering the centre of gravity below the centre of curvature of the test member by a predetermined amount, whereby the centre of gravity of the apparatus will tend to take up a position vertically below the centre of curvature of the test member and being free to take up this position, the weight member and the test member supporting it, will constitute a pendulum oscillating about and finally coming to rest in the line vertically below the centre of curvature of the test member. Instead of the centre of gravity being lowered, it may be raised by a predetermined amount above the centre of curvature of the test member, in which case the angular movements of the weight member will be more sensitive than when the centre of gravity is below the centre of curvature of the test member.

An inclinometer is provided with the apparatus for indicating the vertical position and for measuring the amplitude of the oscillation on either side of it.

Upon the accompanying drawings—

Fig. 1 illustrates a front elevation.

Fig. 2 a plan.

Fig. 3 an end elevation of one example of said hardness testing apparatus.

Figs. 4, 5, and 6 illustrate enlarged sectional views of detail parts.

Fig. 7 illustrates a sectional elevation of one end of the inclinometer.

Fig. 8 illustrates a plan of a detail part hereinafter described.

Figure 1:
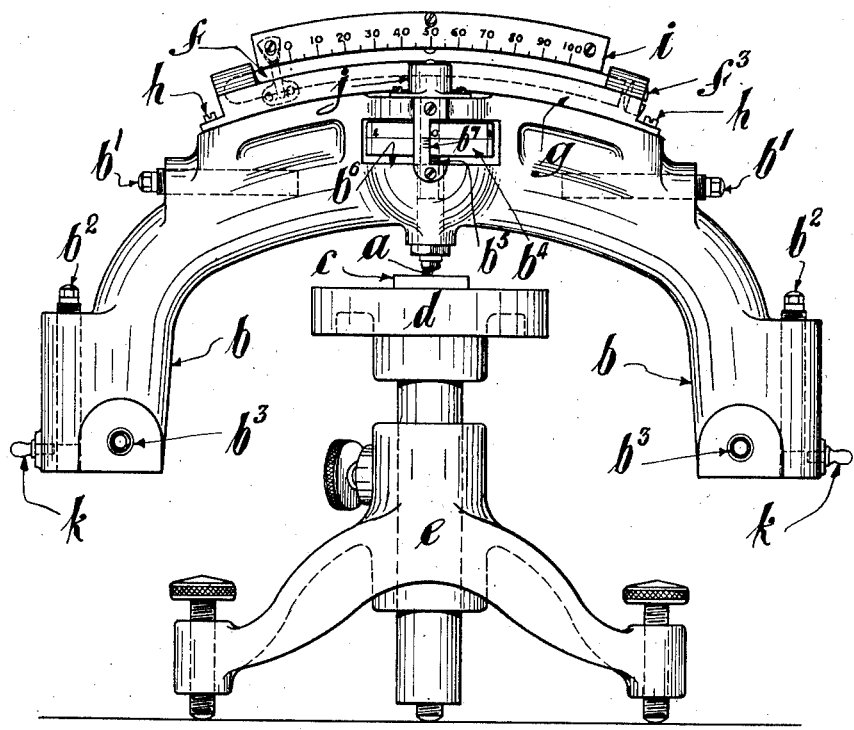

$a$ is the test member, $b$ the weight member, c the piece of material to be tested for hardness. d is a table or surface plate adjustably supported by an adjustable stand or tripod e for supporting the test piece and the instrument.

The weight member b is preferably of arched formation, with one half an exact fac-simile of the other half and made with as even a balance as possible in its manufacture. To ensure of correct balancing, adjustable screw plugs $b'$, $b^2$, $b^3$ are provided which allow of the weight member b being balanced in three directions when supported by the test member a on the test piece c, the centre of gravity of the weight member when in neutral equilibrium coinciding with the centre of curvature of the test member a. $b^4$ is a further weight member which is in the form of a metal disc, mounted on a fixed vertical and screw-threaded spindle $b^5$ within a recess $b^6$ in the weight member b. By rotating said disc $b^4$ it moves up or down the spindle and thereby causes the centre of gravity of the pendulum to lie below the centre of curvature, or above such centre, as required. The degree of displacement is the length of the pendulum, which may be the same both for "time" tests and "scale" tests. For hard materials the standard length of the pendulum will preferably be about 0.1 millimetre. For very soft materials a longer pendulum may be used.

To facilitate the correct adjustment of the weight $b^4$, the latter is provided with an annular datum line (see Fig. 1) while bridging the opening of the recess in which the weight member lies is a relatively fixed scale plate $b^7$. The weight member $b^4$ is provided along said datum line, (see Fig. 8) with five vertical graduations each graduation representing a displacement of the centre of gravity of the weight member b of .01 millimetre.

The graduations on the scale plate $b^7$ each represent a displacement of .05 millimeter. Therefore, the reading of the graduations show displacement of the centre of gravity in 100ths of a millimetre.

The test member a is preferably a complete sphere of sapphire or hardened steel, and for testing very hard materials is preferably 1 millimetre in diameter. For very soft materials a larger ball may be used.

The means for holding the test member in position consists of a chuck, which may take the form shown in Fig. 4, or the form shown in Fig. 5. In the former case (Fig. 4) the ball is held by friction in the slightly smaller entrance of the hole in the chuck, a screw plunger $a'$ being provided to expel the ball when necessary. In the other case (Fig. 5) the ball is held between the conical face of the hole in the chuck and the lower end of a spindle $a^2$ screwed into the weight member b.

The inclinometer shown is of the spirit level pattern consisting of a closed-ended glass tube f filled with a liquid except for a bubble of air. The tube is curved and held at each end by metal caps forming part of a metal holder g secured by screws h to the main weight member b. Both ends of the glass tube are hermetically sealed and one preferably by the glass itself and the other by means of a rubber stopper $f'$, a ball or pellet $f^2$ and a screwed metal plug $f^3$, see Fig. 7. This arrangement allows of the air bubble being adjusted to compensate for any alteration in its size due to variations in temperature.

Figure 2:
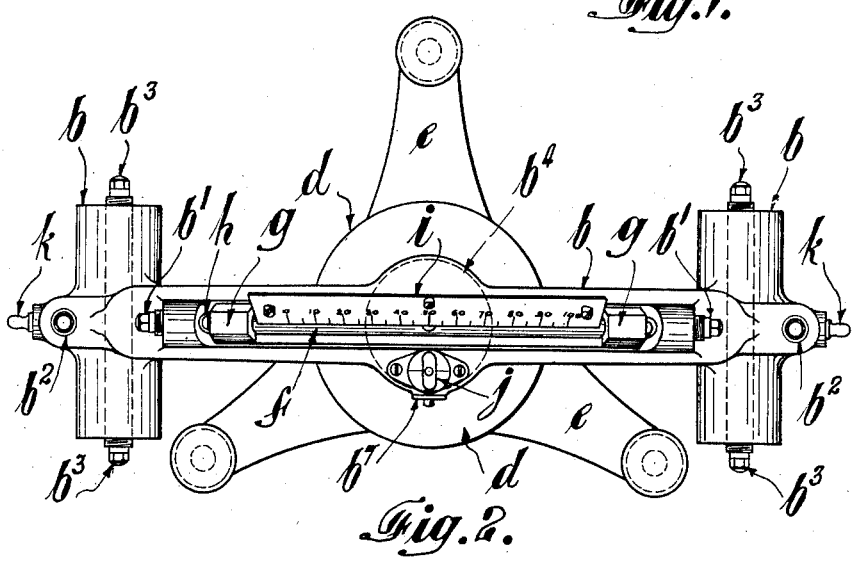

Above the tube is a scale plate i marked with divisions and numbers preferably 0 to 100 corresponding to arbitrary hardness numbers. A further spirit level j is arranged alongside and at right angles to the tube f, see Fig. 2, for the purpose of showing whether the principal plane of the instrument is vertical.

In making a "scale" test for hardness, the pendulum (comprising the test member a, the weight member b, and the inclinometer) which may have had its centre of gravity adjusted to lie below the centre of curvature is gently placed upon the piece of material to be tested, see Fig. 1, with the gravitational axis vertical. If it does not rest in that position (owing to the small area on which the ball rests not being level) the table d is titled until the air bubbles come to the centre of the respective scales.

Under the weight of the pendulum the test member forms an indentation or depression in the test piece. The operator then tilts the pendulum from the vertical position until the air bubble comes to 0 on the inclinometer scale, and then releases same. The act of tilting the pendulum from the vertical position to 0 may be presumed to elongate the original indentation and when the pendulum is released the test member rolls back along the indentation so elongated. By observation of the amplitude of oscillation of the pendulum after being released from 0, an accurate measure of the comparative hardness of the material under test can be obtained. The amount by which the scale reading is less than 100 represents the amount of energy absorbed in deforming the material.

If the surface on which the test member rolls is hard it will be very slightly indented by the test member, the resistance to rolling will be slight, and the loss of amplitude will be slight, but if the surface on which the test member rolls is soft, the test member will sink in or indent the surface more deeply and the resistance to rolling will be increased and the loss of amplitude will be greater.

The scale test may be effected in other ways. One way would be by placing the pendulum on the test piece with the bubble at 0, and then releasing same, another way would be by placing the pendulum on the test piece with the bubble at 100, and then rocking the same to 0, and releasing.

In making a "time" test the pendulum is placed gently on the specimen in an approximately horizontal position (or bubble at or near 50) and is caused to oscillate through a small arc. The period of oscillation is conveniently measured with a stop watch and the "time" hardness numbers are conveniently expressed in seconds for say 10 single oscillations. Thus, by comparing the time taken for a given number of oscillations, the differences in hardness of various materials can be readily determined.

The period of oscillation depends on the depth of the depression in which the test member rests.

By this invention it will be seen that two independent hardness scales are provided, one, a scale corresponding to angular displacements for "scale" tests, and another of seconds for "time" tests. In each case the hardness numbers are from 0 to 100. The adjustment of the pendulum will usually be such that 10 single swings are made on a very hard material such as sapphire or glass in exactly 100 seconds. Thus, the scale test for glass is 97, and for lead 0. The "time" test in 10 swings for glass is 100 seconds, and for lead 3 seconds.

To increase the sensitiveness of the pendulum on "time" tests, the centre of gravity is adjusted to a position above, instead of below the centre of curvature of the test member.

In actual time tests, it has been found that with the centre of gravity below the centre of curvature, the hardness numbers (seconds for 10 swings) of three specimens of hardened steel supposed to be hardened alike, were as follows: 57, 58 and 62. With the centre of gravity above the centre of curvature, the hardness numbers (seconds for 10 swings) were 77—5, 84 and 101. In other words, as the centre of gravity was raised the interval between the hardness numbers was increased from 5 seconds to 23—5 seconds.

In one convenient size of the improved apparatus the weight member $b$ will be about 12 inches long and from 2 to 4 kilogrammes in weight. The size and weight of the apparatus however may vary.

To facilitate the tilting and releasing of the pendulum small knobs $k$ are provided.

In a modification, see Fig. 6, there may be two test members arranged side by side and having a common axis of rotation. In this arrangement the pendulum will be constrained to swing in one plane only. It may however, be less sensitive than the single test member, or require a smaller length of pendulum to give the same sensitiveness of movement as the pendulum with the single test member.

When only required for "time" tests, the scale plate $i$ may be without the numerals.

Although preferring the weight member $b$ to be of the shape shown, it may take a variety of other shapes, and the means for lowering and raising the centre of gravity may be effected by other means than the disc $b^4$.

In addition to indicating the hardness of a material, the apparatus may also serve for indicating the elastic properties of same, since it has been found that from the "scale" and "time" tests combined, certain deductions can be made or inference drawn, as to the physical properties of the materials, as well as to the hardness of same.

What I claim is:—

1. A method of testing the hardness of metals or other solid materials, wherein the test member, comprising a member shaped to roll and a weight member, in making a test, is rolled on the surface of the material to be tested under the influence of a potential energy tending to cause rolling oscillation, the hardness of the material being ascertained by observing the motion of the test member.

2. A method of testing the hardness of metals or other solid materials, wherein the test member comprising a member shaped to roll and a weight member, in making a test, is pressed into the surface of the material to be tested to form an indentation, and wherein the test member under the influence of a potential energy tending to cause rolling oscillation is rolled along the material to elongate the indentation, the hardness of the material being ascertained by observing the angular motion of the test member.

3. A method of testing the hardness of metals or other solid materials, consisting in rolling a test member of hard substance, shaped to roll, on the surface of the material to be tested by means of a free compound pendulum, and observing the motion of the pendulum.

4. A method of testing the hardness of metals or other solid materials wherein the test member, comprising a member shaped to roll and a weight member, in making a test, is pressed into the surface of the material to be tested to form an indentation by the weight member, and wherein said test member, under the influence of a potential energy tending to cause rolling oscillation, is caused to oscillate in the said indentation, the hardness of the material being ascertained by observing the "time period" for a given number of oscillations of the test member.

5. A method of testing the hardness of metals or other solid materials, wherein the test is effected by rolling a weighted test member on the surface of the material to be tested and thereby forming an elongated depression and the measurement of the depression being determined by the time period of the oscillation of the test member therein under gravity.

6. In means for testing the hardness of metals or other solid materials, a test member, comprising a member of hard substance shaped to roll, and a weight member, said weight member being carried by said test member and serving for pressing same against the surface of the material to be tested and for producing a free rolling motion of the test member on and relative to said surface when making a test, and means for indicating the angular movements of the test member.

7. In means for testing the hardness of metals and other solid materials, a weighted pendulum, the pivot of which consists of a hard substance with a curved face, and is supported by and is free to roll on the surface of the materials to be tested, under the oscillations of the pendulum, and means for indicating the angular movement of the pendulum and the energy consumed in oscillating the pendulum during the test, as set forth.

8. In means for testing the hardness of metals, or other solid materials, a test member made of a hard substance and to the form of a sphere of small diameter, a weight member, means for attaching said test member centrally to the weight member, adjustable weight members for balancing the main weight member in three directions about the test member and a further weight member for causing predetermined displacement of the centre of gravity of the main weight member, as set forth.

9. In means for testing the hardness of metals or other solid materials, a test member of hard substance made to a form suitable for rolling upon a flat surface, a weight member attached to said test member, and supported by said test member when resting upon the test piece, the test member and weight being free to oscillate, the centre of gravity of the weight member being below the centre of the curvature of the test member, as set forth.

10. In means for testing the hardness of metals or other solid materials, a test member of very hard substance and of a form suitable for rolling on a flat surface, a weight member attached to said test member, and capable of oscillating about the centre of the test member when resting on the test piece, a rigid and adjustable support for the test piece and means for adjusting the centre of gravity of the weight member below, or above, or coincident with the centre of the test member, and an inclinometer for indicating the deflection of the weight member and test member when tilted, and the amplitude of the oscillations when said weight member is made free after being tilted, as set forth.

11. In means for testing the hardness of metals or other solid materials, a spherical test member of hard substance, a weight member in the form of an arched metal body, means for attaching said test member to the weight member at a point central to the length and width of said weight member, said weight member having a centrally disposed opening formed in it, a fixed screwed spindle arranged transversely of said opening, a further weight member on said spindle adapted to move up and down the spindle on being rotated, and thereby vary the position of the centre of gravity of the main weight member and an inclinometer carried by the weight member whereby the degree of deflection of the main weight member and test member out of the vertical is indicated, as set forth.

12. In means for testing the hardness of metals or other solid materials, a spherical test member of hard substance, a weight member in the form of an arched metal body with downwardly extending extremities the parts of the weight member to right and left of its medial line being a facsimile of each other in shape, size and weight, means for attaching said test member to the weight member at a point central to the length and width of said weight member, said weight member having a centrally disposed opening formed in it, a fixed spindle with screw thread of millimetre pitch in said opening, a circular metal disc on said spindle, adapted to move up and down the spindle on being rotated and thereby vary the position of the centre of gravity of the weight member, an inclinometer secured to the top of the weight member and comprising a glass tube partly filled with liquid and having an air bubble, and also comprising a plate with divisions and numbers marked on it, said divisions and numbers representing respectively the degrees of deflection out of the vertical and the hardness numbers of varying materials, as set forth.

13. In means for testing the hardness of metals or other solid materials, a spherical test member of hard substance, a weight member in the form of an arched metal body with downwardly extending extremities forming pillars or feet, adjustable weights for balancing the weight member in three directions about the test member, means for attaching said test member to the weight member at a point central to the length and width of said weight member, said weight member having a centrally disposed rectangular opening formed in it, a fixed screwed spindle in said opening, a circular metal disc on said spindle adapted to move up and down the spindle on being rotated, and thereby vary the position of the centre of gravity of the weight member, said disc having a datum line and graduations on its periphery and the main weight member having a scale plate with graduations for enabling the displacement of the centre of gravity to be readily determined, an inclinometer mounted on the top of the weight member whereby the degree of angular movement of the weight member and test member is indicated, and a further inclinometer on the main weight member for indicating when the principal plane of the instrument is vertical or otherwise as set forth.

In testimony whereof I have signed my name to this specification.

EDWARD GEISLER HERBERT.